May 12, 1964   L. G. GROTZINGER   3,132,908
THRUST BEARING CONSTRUCTION
Filed April 2, 1962                         2 Sheets-Sheet 1
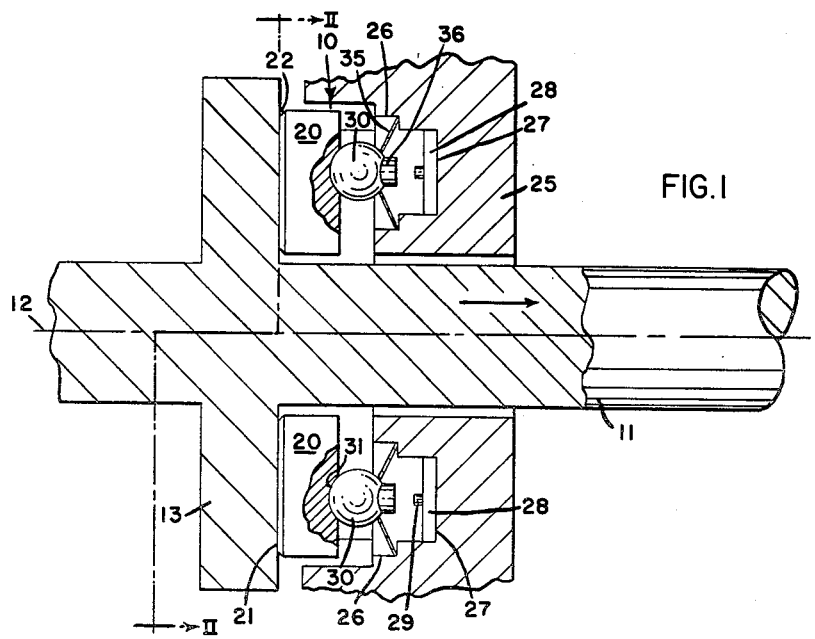
FIG. 1
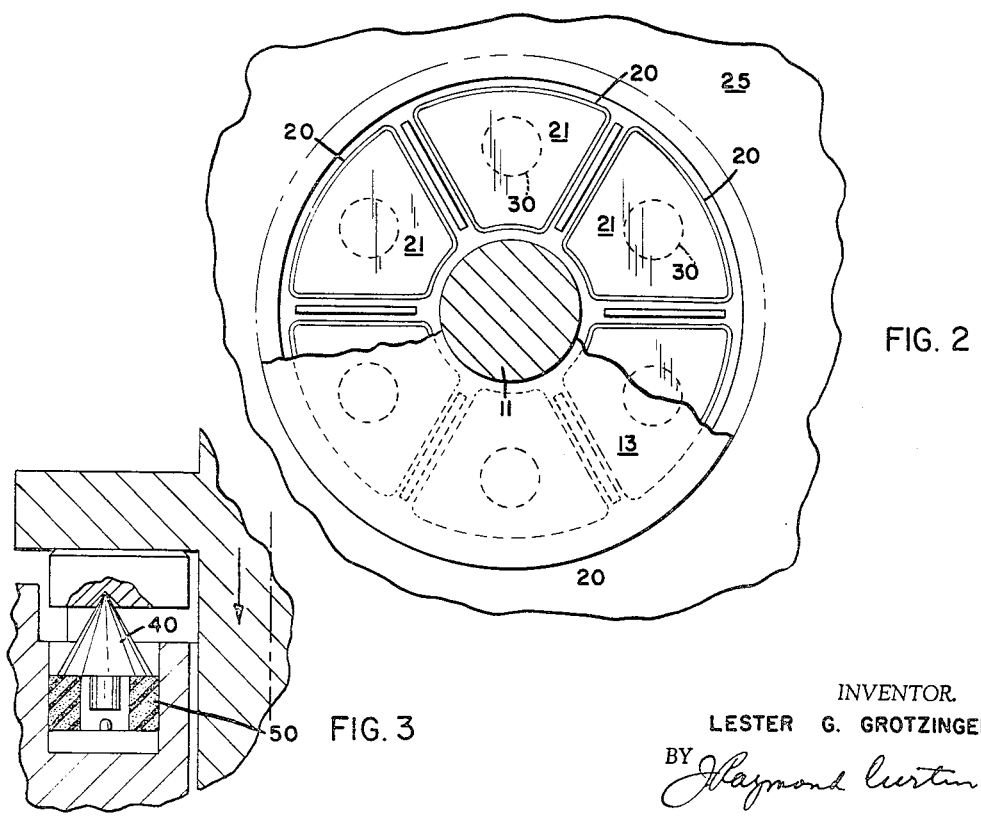
FIG. 2
FIG. 3
INVENTOR.
LESTER G. GROTZINGER
BY *Raymond Curtin*
ATTORNEY.

May 12, 1964   L. G. GROTZINGER   3,132,908
THRUST BEARING CONSTRUCTION
Filed April 2, 1962   2 Sheets-Sheet 2

INVENTOR.
LESTER G. GROTZINGER.
BY
ATTORNEY.

United States Patent Office 3,132,908
Patented May 12, 1964

3,132,908
THRUST BEARING CONSTRUCTION
Lester G. Grotzinger, Greensburg, Pa., assignor to Carrier Corporation, Syracuse, N.Y., a corporation of Delaware
Filed Apr. 2, 1962, Ser. No. 184,301
6 Claims. (Cl. 308—160)

This invention relates to bearing constructions, more particularly to means for equalizing load distribution over the bearing surface. The novel construction is of particular use when the bearing is employed as a thrust bearing for a rotating shaft.

A variety of load equalizing bearings have been evolved to provide support for rotating shafts. These bearings are generally of a segmented construction in which the segments or pads are movably mounted with respect to each other so that upon the application of greater forces on any one area of the bearing surface the pad will be displaced to thereby equalize the bearing load over the entire bearing surface. It is necessary to obtain this load equalization since the lubricating film is relatively thin and a localized increase in load at any one point on the bearing surface may result in a breaking down of the lubricating film with resultant undesired wear. These load equalizing bearings are movably mounted in a variety of fashions, either by means of spring members, pivot members or the like elements permitting relative movement between the bearing pads and the supported member.

Notwithstanding the fact that these pads are movable to provide load distribution over the bearing surface, it is necessary to accurately position the bearing surfaces with respect to the rotating member moving thereover so that all of the pad faces contribute desired bearing area to maintain desired lubrication. As is apparent if one of the pad faces is not in contact with the rotating member surface, the load exerted by the rotating member on the remaining bearing faces increases with a resultant increase in bearing stress, and an increase in likelihood of destruction of lubricant film.

It is with the above problems and desiderata in mind that the present means have been evolved, means including both method and apparatus providing a load equalizing bearing structure in which adjustment of the bearing pads is a relatively simple matter, and the occurrence of an undesired load situation on any of the bearing surfaces is signaled, thereby permitting machine shutdown or corrective actions reducing thrust load.

It is accordingly an object of this invention to provide a novel bearing structure providing continued maintenance of lubricant film over the bearing surfaces.

It is another object of this invention to provide a bearing arrangement particularly adapted in the formation of thrust bearings for rotating shafts.

It is an additional object of the invention to provide a bearing in which load distribution may readily be equalized over the entire bearing surface.

It is also an object of this invention to provide a bearing structure in which a signal will be provided upon the occurrence of an undesired load situation on the bearing.

A further object of the invention is to provide a novel mount for bearing structures permitting self adjustment of the bearing under varying load conditions.

These and other objects of the invention which will become hereafter apparent are achieved by forming a novel bearing of a plurality of pads or bearing shoes which are movably mounted relative to each other. Each pad is supported for pivotal movement by means of a pivot mount preferably in the form of a sphere or ball. The pivot mount is yieldably supported by resilient means having a non-linear force-displacement relationship. Preferably, this is accomplished by positioning the pivot mount on the apex of a Belleville spring arranged within a backing member. Also, if desired, there may be arranged adjacent the pivot mount a switch member which may be coupled to a suitable alarm, signal, or to the control of the mechanism of which the bearing forms a part. The novel bearing structure is such that the pivotal action of the pad provided by the pivot mount provides for self orientation to generate wedge film lubrication. Additionally, load equalization between different pads is provided by the resilient mounting action of the Belleville spring so that as the load on each pivot mount is increased the Belleville spring is proportionately deflected to displace the pad and reduce the load thereon whereby the load will be transferred to the remaining pads. Upon continued deflection of the Belleville spring, it reaches its over center position and "snaps through" thus displacing the pivot mount. The displaced pivot mount may then move against the switch to activate an appropriate signal, or the switch may be coupled to the actuating circuit for the mechanism to stop same.

An important feature of the invention resides in the use of the Belleville spring providing the desired "snap through" action.

Another feature of the invention resides in the provision of an additional range of spring biased movement for the pivot pin after the Belleville "snap through."

A further feature of the invention resides in the signaling function which is obtained after the pivoting mount has moved through a safe range of movement into a secondary range of movement.

A still further feature of the invention is the provision of a novel resiliently mounted support for the bearing pads.

The specific details of a preferred embodiment of the invention, and their mode of functioning will be made most manifest and particularly pointed out in clear, concise, and exact terms in conjunction with the accompanying drawings, wherein:

FIGURE 1 is a schematic cross-sectional view through a thrust bearing illustrating the relationship between the shaft, the thrust runner and the bearing pads;

FIGURE 2 is a cross-sectional view taken on line 2—2 of FIGURE 1 illustrating the relationship between elements forming the thrust bearing;

FIGURE 3 is a detail view of another embodiment of the invention;

Figure 5:
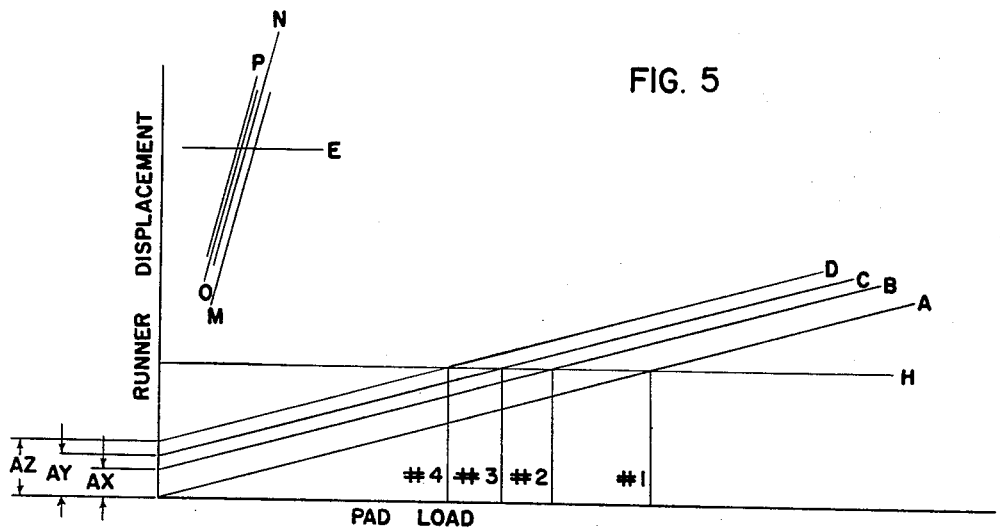
FIGURE 5 is a graphical presentation of the relationship between pivot mount displacement and bearing load utilizing conventional mounting means.

A thrust bearing assembly of the kind contemplated herein includes a thrust runner affixed to a shaft and a series of circumferentially spaced thrust bearing pads arranged to support a load, designed to vary within a given range, transmitted by the shaft through the thrust runner. Usually conventional compression coil springs are employed to urge the pads into engagement with the runner. It will be appreciated that loading on the pads will cause compression or displacement of the springs supporting the pad. The conventional helical coil springs are usually designed so that the displacement of the spring varies directly with the force in a manner determined by the strength of the spring. FIGURE 5 shows a force-displacement relationship between a series of relatively strong springs A, B, C and D and additionally shows the same relationship between a series of relatively weak springs M, N, O and P. It will be appreciated that normal manufacturing tolerances on the parts involved prevent each of the springs A, B, C and D being loaded or engaged equally and simultaneously. With the construction shown, the thrust runner will engage the pad supported by spring A initially, then will engage the pad supported by spring B next after the thrust runner has moved a distance AX, the pad supported by spring C after the thrust runner has moved a distance AY and finally it will engage the pad supported by the spring D after the runner has moved a distance equal to AZ. From the graph it will be obvious that the loading per spring and pad varies considerably for relatively high load and low thrust runner movement of an amount indicated by horizontal line H.

Considering the curves M, N, O and P, it will be observed that while the loading per spring varies to a lesser extent and hence, is more equally distributed, the thrust runner displacement indicated by line E is large for a relatively small load. This is due to the fact that the individual springs M, N, O and P are weaker and have less resistance to deformation than springs A, B, C and D. Springs having a force-displacement characteristic of the kind illustrated are objectionable because too great a displacement is involved for a relatively large load. In order to compensate for the excessive pad travel experienced at larger loads it is necessary to enlarge the size of the parts involved, adding additional if not prohibitive cost to the assembly.

Figure 4:
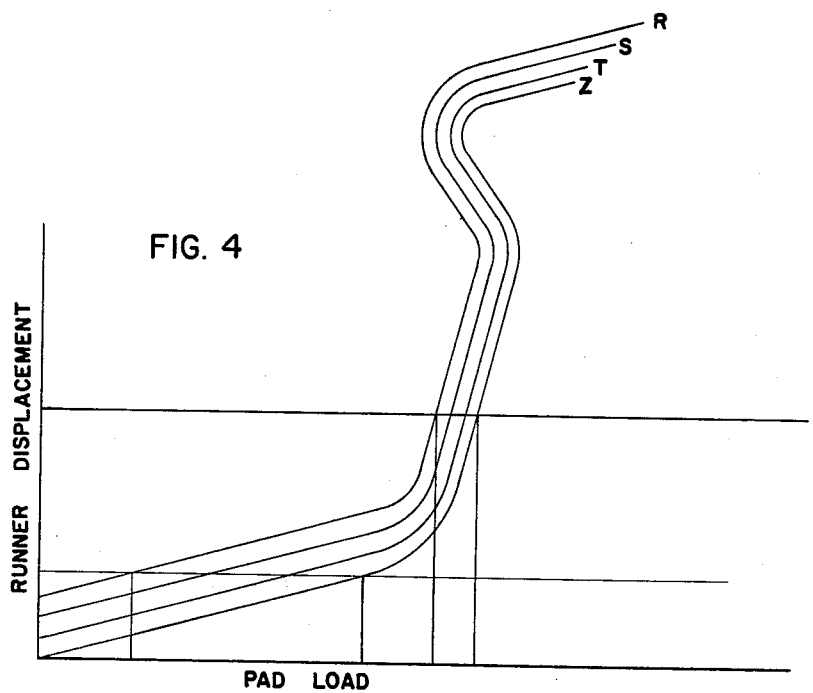
FIGURE 4 is a graphical presentation of the relationship between pivot mount displacement and bearing load utilizing the novel mounting means depicted in FIGURE 1.

The invention in its broadest concept contemplates a resilient mounting for each pad which has a force-displacement characteristic R, S, T and Z, shown in FIGURE 4. Thus, the unequal distribution of load occurs only at relatively light loadings. At high loads, the change in the resilient support characteristic allows a moderate displacement and achieves true equalization of pad load.

As best seen in FIGURES 1 and 2, a novel bearing 10 is shown by way of illustration embodying the instant inventive concept in connection with a thrust bearing. Bearing 10 supports shaft 11 rotating about an axis of rotation 12 illustrated by dot dash lines. Shaft 11 exerts a thrust force in the direction of the arrow against thrust runner 13, which rotates with shaft 11. Appropriate runner bushings and the like conventional seals and fittings are employed as will be understood by those skilled in the art.

The bearing shoes or pads 20 are arranged circumferentially about shaft 11 with the bearing face 21 of pad 20 contacting the thrust runner 13 as viewed in the drawing. The edges of the pad 20 are beveled at 22 to implement the flow of lubricant between the bearing face 21 and the thrust runner 13.

A backing ring 25 as best seen in FIGURE 1 is arranged on the side of the pads 20 remote from thrust runner 13. In the thrust bearing illustrated, the backing ring 25 extends circumferentially about shaft 11 and is formed with adequate clearance to permit free shaft rotation. The backing ring 25 is formed with a plurality of spaced recesses 26, one for each pad 20. A countersink 27 is formed at the bottom of recess 26, and within this countersink an appropriate alarm switch 28 is positioned. Alarm switch 28 is of any conventional type which may be incorporated in a circuit and be actuated by the application of pressure to the switch arm 29. A spring pressed non-conducting push button is most eminently suitable for switch arm 29. Closing of the switch, as will be understood by those skilled in the art is accomplished by application of pressure to the push button.

Arranged within recess 26 is a pivot mount in the form of ball 30. Ball 30 is positioned within a recess 31 formed in bearing pad 20 as viewed in FIGURE 1. A two range spring in the form of Belleville spring 35 is positioned within recess 26 to support ball 30 which is preferably formed with pin 36 extending through the Belleville spring 35 into contact with the switch arm 29.

In the embodiment of the invention illustrated in FIGURE 3, the pivot mount is formed by means of a conical member 40 instead of a ball 30 and the resilient support element 50 is formed of an elastic composition having a plurality of air filled spaces interspersed throughout. Initial compression of element 50 deflates the spaces and involves a force displacement relationship similar to FIGURE 5. Continued compression results in elastic composition deformation having a force displacement curve R, S, T, Z, similar to that shown in FIGURE 4.

The aforedescribed bearing structure has been illustrated and described in conjunction with a thrust bearing installation. It will, however, be apparent to those skilled in the art that the inventive concept here embodied in a thrust bearing may readily be embodied in a variety of other types of bearing structures.

In the illustrated thrust bearing 10, any change in position of shaft 11 will result in displacement of thrust runner 13. In order to maintain adequate clearance between the bearing pads 20 and the thrust runner 13 so as to insure the presence of a desired lubricating film between bearing surface 21 and thrust runner 13, it is necessary that the bearing pad be reoriented upon any displacement of the shaft and runner.

The novel mount 30 supported on spring 35 implements pad orientation in response to the forces exerted on the bearing surface 21. Where the displacement of the thrust runner is primarily angular with respect to the axis of rotation of the shaft, the bearing pad will be similarly angled about pivot mount 30 so that the bearing surface will be substantially parallel to that of the thrust runner. In the event of an axial displacement of the shaft 11 the thrust runner 13 will be correspondingly displaced, as will the bearing pads 20. The spring force exerted by Belleville spring 35 on pad 20 acts counter to the load exerted on the pad by the thrust bearing.

As best seen in FIGURE 4, with an increase in thrust force there will be an increase in axial displacement of the pad and pivot mount. The relationship between thrust force and pivot mount displacement is shown by the curve in FIGURE 4, where it is seen that this relationship is linear through a given range of operation which for design purposes will be regarded as a normal operating range. The spring 35 is designed to accommodate a given maximum load at which point it snaps through to provide another range of spring biased movement for the pivot mount. In this second range of operation, the signal switch is contacted by the pivot mount so as to control an electrical circuit which may be employed either to deenergize the apparatus, or provide a desired appropriate signal.

It is thus seen that a novel bearing construction has been provided in which the bearing pads are self-adjusting to provide desired clearance for a lubricant film.

The above disclosure has been given by way of illustration and elucidation, and not by way of limitation, and it is desired to protect all embodiments of the herein disclosed inventive concept within the scope of the appended claims.

I claim:

1. Bearing means for supporting a rotating shaft, said means comprising: pad means arranged adjacent said rotating shaft; bearing surface means on said pad means against which a bearing force produced by the rotation of said shaft may be supported; pivot means supporting said pad means for pivotal movement; and resilient means yieldably supporting said pivot means and elastically biasing same against said pad means, said resilient means having a force-displacement characteristic represented by a curve having a first portion of relatively shallow slope and a second portion of relatively steep slope.

2. The invention set forth in claim 1 wherein said resilient means includes a Belleville spring.

3. The invention set forth in claim 1 wherein said resilent means includes a material comprising a plurality of air spaces within its boundaries.

4. Bearing means for supporting a rotating shaft, said means comprising: pad means arranged adjacent said rotating shaft; bearing surface means on said pad means against which bearing force produced by the rotation of said shaft may be supported; pivot means supporting said pad means for pivotal movement; and spring means yieldably supporting said pivot means and elastically biasing same against said pad means, said spring means having two ranges of elastic movement, whereby the pivot means may be displaced through one range up to a yield point, beyond which a second range of elastically biased movement may be obtained.

5. Means as in claim 4 in which signal means are arranged adjacent said pivot means for actuation thereby upon movement of said spring means into the second range of spring movement.

6. In combination with a machine having a rotor member having a rotating runner on which there is a thrust load; a self-equalizing thrust bearing comprising a plurality of oil immersed non-rotating segmental bearing shoes bearing against a surface of said rotating runner; a plurality of pivot mounts, one for each shoe; a Belleville spring supporting said pivot mounts at the center of said spring; and a switch controlling the energization of a circuit, said switch positioned adjacent said Belleville spring on the side thereof opposite to that of said pivot mount in position for contacting by said pivot mount after said Belleville spring has been forced through its snap through position.

References Cited in the file of this patent

UNITED STATES PATENTS

| | | |
|---|---|---|
| 2,191,901 | Wallgren | Feb. 27, 1940 |
| 2,906,571 | Casacci | Sept. 29, 1959 |